United States Patent [19]

Curry

[11] 3,804,334
[45] Apr. 16, 1974

[54] CONTROLLED MOISTURE EMITTER

[76] Inventor: Byron V. Curry, 6 W. Orange Grove, Arcadia, Calif. 91006

[22] Filed: Feb. 9, 1973

[21] Appl. No.: 330,984

[52] U.S. Cl............................... 239/276, 239/542
[51] Int. Cl............................................. B05b 1/02
[58] Field of Search....... 239/542, 547, 276; 138/42

[56] References Cited
UNITED STATES PATENTS

| | | | |
|---|---|---|---|
| 3,586,239 | 6/1971 | Blass | 239/542 X |
| 3,518,831 | 7/1970 | Tibbals, Jr. et al. | 239/542 X |
| 2,753,953 | 7/1956 | Tear | 239/542 X |
| 3,604,728 | 9/1971 | Symcha et al. | 239/542 X |
| 3,729,142 | 4/1973 | Rangel-Garza et al. | 239/547 X |

Primary Examiner—M. Henson Wood, Jr.
Assistant Examiner—Michael Y. Mar
Attorney, Agent, or Firm—Jackson & Jones

[57] ABSTRACT

A watering device intended for use in watering plants includes a body with a bore adapted to receive a resilient water supply tube solvent welded at one end. A second part is a threaded member adapted to make an interference fit with an internal or external wall of the body and to be adjustable therewith such that the thread groove and a body wall provide a channel of adjustable length to alter the water flow rate from the tube through the body. Relative taper between the body wall and the threaded member may also provide flow adjustment as the position of the member in the bore is altered to change the degree of interference fit between the bore and the threaded member, changing the channel depth, as defined between the body wall and the thread groove. Alternatively the body may be internally or externally threaded and receive a cylindrical ring or post to define the water flow channel.

22 Claims, 19 Drawing Figures

PATENTED APR 16 1974　　3,804,334
SHEET 1 OF 3
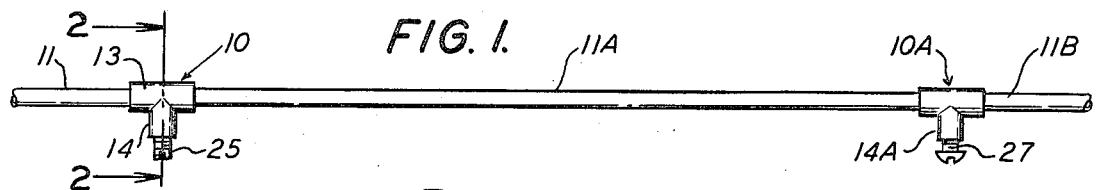
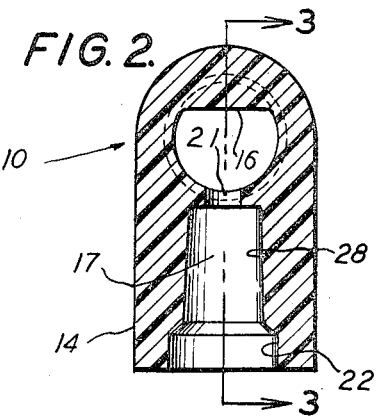
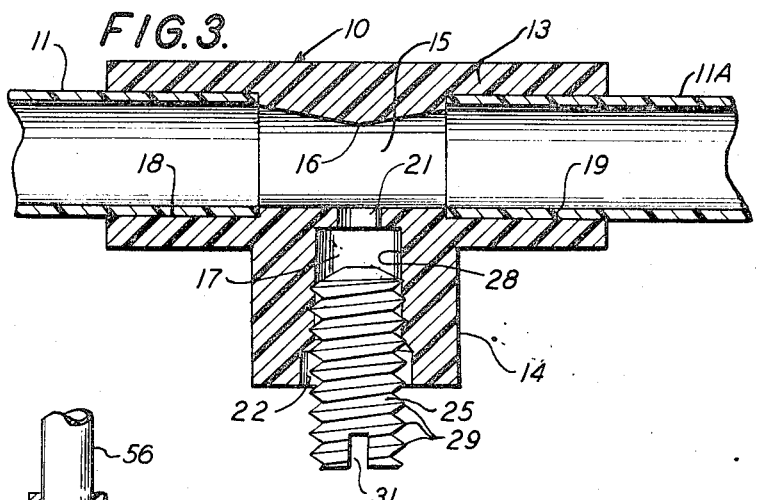
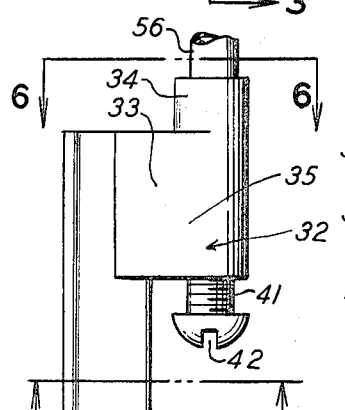
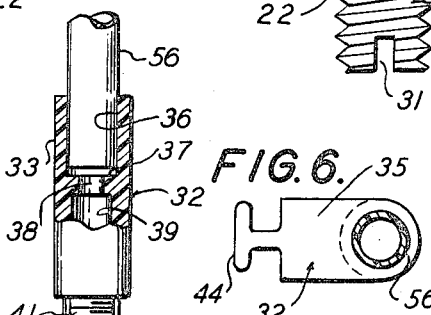
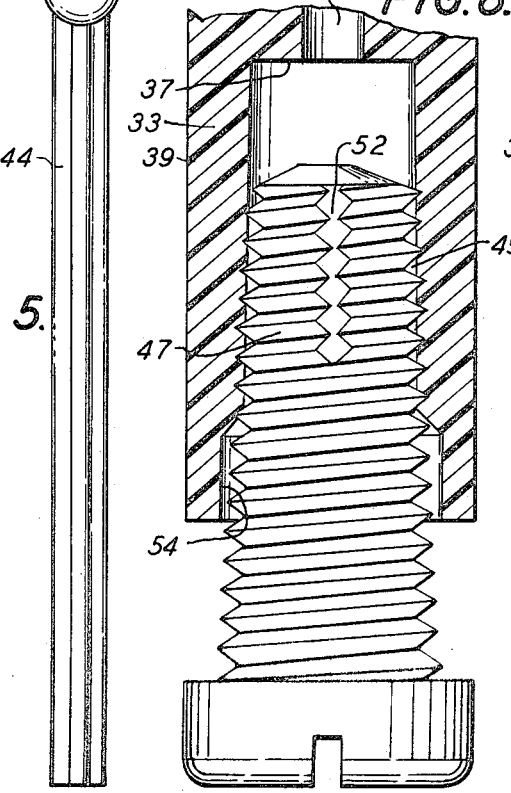
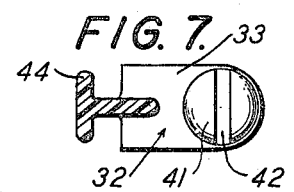
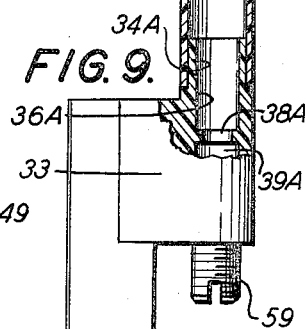
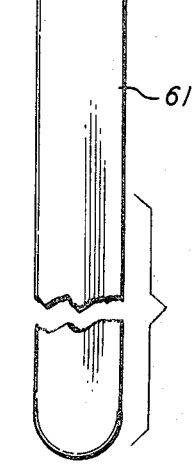

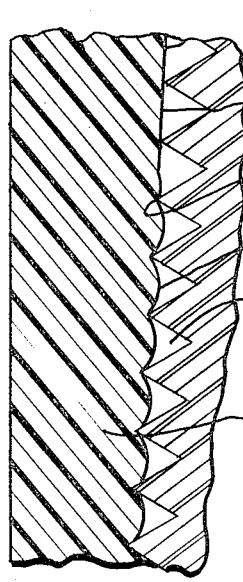
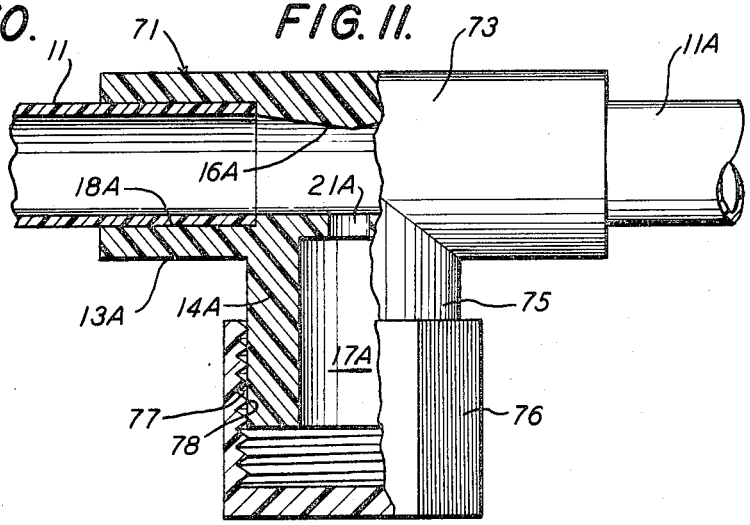
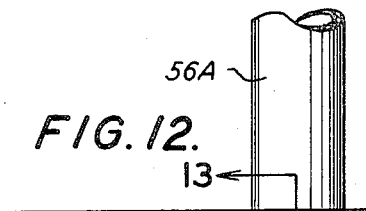
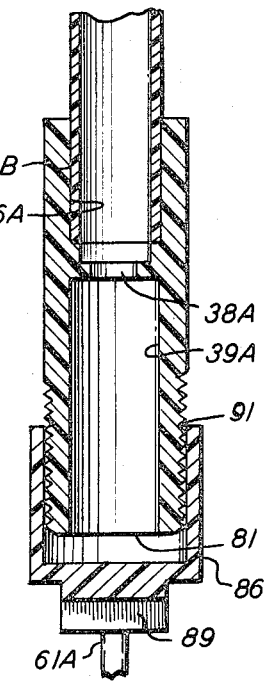
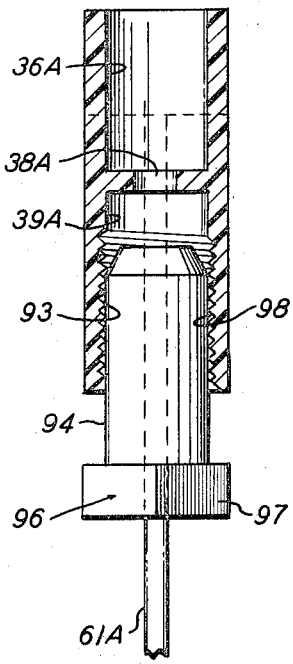

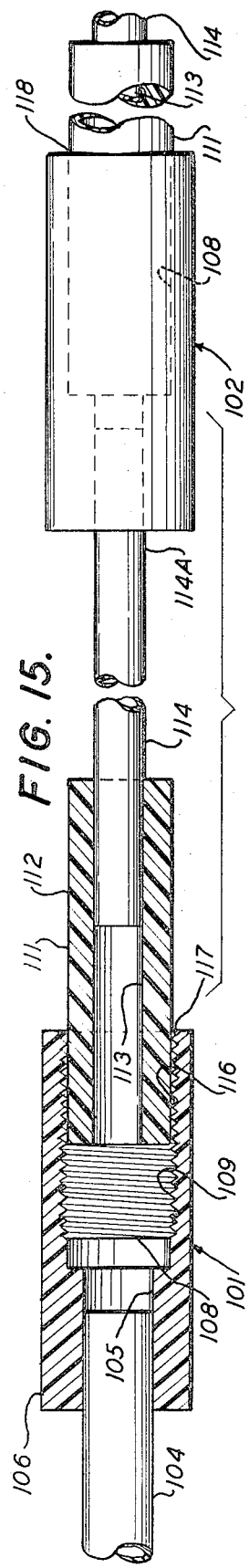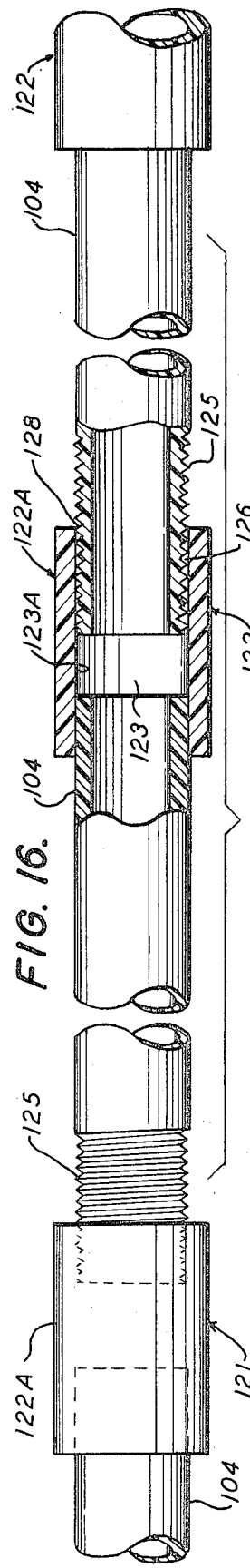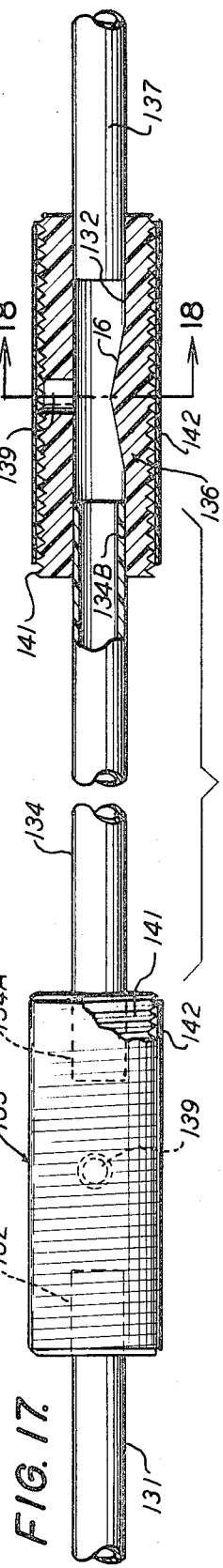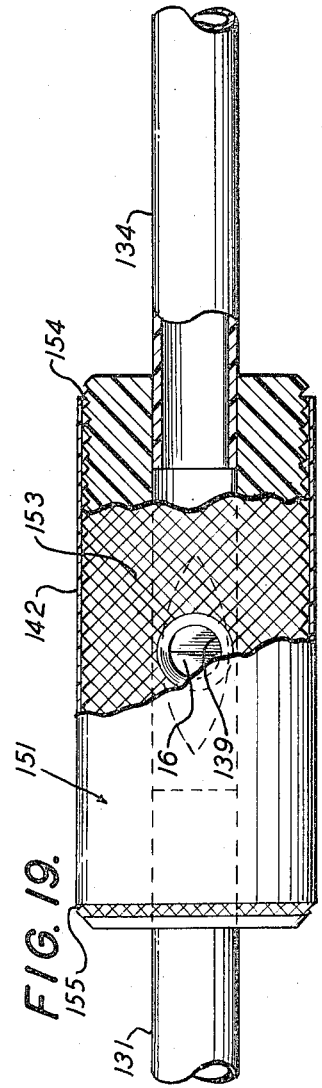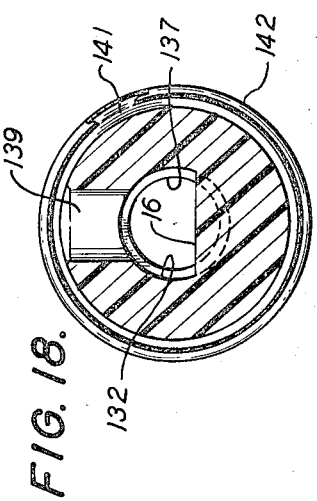

CONTROLLED MOISTURE EMITTER

BACKGROUND OF THE INVENTION

Known valves and irrigation devices encompass hundreds of different types and variations. In spite of this fact there is still a need for specific new and improved types for specialized applications or uses. One of the fields where new and specialized watering devices are needed is in the area of field plant watering. A number of different structures and procedures have, of course, been developed for use in this and allied fields. Such structures are in part exemplified by those shown in U.S Letters Patent 3,595,524 issued July 27, 1971, David E. Mominee, inventor, and U.S. Letters Patent 3,638,863 issued Feb. 1, 1972 to James C. Roberts.

Currently it is frequently desired to water plants using small individual moisture emitters located in the immediate area where a plant is growing, and to supply such emitters with water from a flexible or resilient plastic or rubber supply tube. In order to be acceptable, devices used for this type of watering should be easily adjusted to alter the flow of water to a desired continuous rate. Further, a device of this type to be acceptable should be comparatively inexpensive and simple, in view of the number needed, and capable of giving prolonged satisfactory performance. It is not considered that any existing watering device meets all these needs for acceptability.

SUMMARY OF THE INVENTION

The invention contemplates in moisture emitters for attachment to a water supply having a tube ending, apparatus comprising means for attachment to the tube ending, a body defining a passage from the end of the tube to a discharge port, and a threaded member and a cylindrical wall interference-fitted together to define a continuous spiral channel from the port to the atmosphere. The fit of the member to the wall preferably is such that relative rotation of the member and wall causes relative displacement of the member and the wall to alter the length of the spiral channel. The passage may be interrupted by a flow restriction to reduce pressure against the member or the wall.

In an alternate embodiment a threaded member and cylindrical wall are joined with a relative taper between the wall and the thread crests such that member displacement in the longitudinal axis alters the channel depth as well as the channel length to adjust water flow in the channel.

The body of the emitter may be attached to an elongate stake for insertion into the soil near the plant being watered. Alternatively, the invention may be embodied in a "T" configuration body for attachment to two tube ends so that the "T" body may be coupled in parallel with other like irrigation structures, along a tube line.

The invention has proved feasible in experimental use for irrigation in varied situations. It has been successfully tested in Sonora desert and in subtropical locations. Papaya trees on sloping ground were constantly supplied at a rate of 34 gallons per minute to an aggregate of 1,200 trees for a 24-hour test period. In addition to acceptable performance the emitter of the invention is economically fabricated from common plastic materials such as polyvinyl chloride which are chemically compatible with the materials conventionally used in detail irrigation lines so that a solvent weld may easily be effected between the inventive device and water supply tubing, eliminating joint fittings and reducing labor costs.

These and other advantages of the invention are apparent from the following detailed description and drawing.

BRIEF DESCRIPTION OF THE DRAWING

FIG. 1 is a plan view of two irrigation moisture emitters in accordance with the invention in situ;

FIG. 2 is a sectional view taken along line 2—2 of FIG. 1;

FIG. 3 is a sectional view of the emitter of FIG. 1 taken along the axis of the supply line;

FIG. 4 is an elevational view of an alternate embodiment of the invention having a mounting stake;

FIG. 5 is a side elevation of the embodiment of FIG. 4;

FIG. 6 is a plan view of the embodiment of FIG. 4;

FIG. 7 is a bottom plan section taken along line 7—7 of FIG. 4;

FIG. 8 is a fragmentary sectional elevation taken along line 8—8 of FIG. 5;

FIG. 9 is a fragmentary elevation, partly broken away, of a further alternate embodiment of the invention;

FIG. 10 is a schematic diagram showing the relationship between the thread grooves and the wall of a body passage;

FIG. 11 is an elevational view, partly in section, of a further alternate embodiment of the invention;

FIG. 12 is a fragmentary elevation, partly in section, of a still further alternate embodiment of the invention;

FIG. 13 is a fragmentary sectional elevation taken along line 13—13 of FIG. 12;

FIG. 14 is an alternate embodiment similar to the embodiment of FIG. 12 shown in sectional elevation;

FIG. 15 is a fragmentary elevational view, partly in section, showing an alternate embodiment serially connected along a supply line;

FIG. 16 is a further alternate embodiment of serially arranged emitters shown partially in section;

FIG. 17 is an elevational view, partly in section, of a still further alternate embodiment of serially arranged moisture emitters;

FIG. 18 is a sectional elevation, partly broken away, and taken along line 18—18 of FIG. 17; and FIG. 19 is a fragmentary elevational view, partly in section, of a further alternate embodiment of an emitter for use in irrigation.

In the various views like parts are given like reference characters.

DESCRIPTION OF THE PREFERRED EMBODIMENTS

In FIGS. 1-3 a moisture emitter with control features is shown. In FIG. 1 a pair of moisture emitters 10, 10A are fed from a supply line such as the line 11 with intermediate sections 11A, 11B which may extend between adjacent moisture emitters. As can best be seen in FIG. 3, emitter 10 comprises a shank 13 and a stem 14, each preferably of cylindrical configuration. Shank 13 has a through bore 15 which is centrally restricted by a planar protrusion 16 whose greatest protrusion is directly opposite a passageway 17 in stem 14. The bore 15 has opposed counterbores 18, 19 at each of its ends to receive the supply tubing 11, 11A. Preferably the moisture emitters are made from a plastic, such as polyvinyl chloride, adapted for solvent welding so that the plastic tubes 11, 11A may be merely dipped in solvent and then inserted into the counterbores and thus secured in attached relationship to the body of the emitter 10.

Stem passage 17 is connected to shank bore 15 by means of a restrictive passage 21. Passage 17 emerges from the stem in a discharge port 22 which may be of a slightly larger diameter than passage 17.

Preferably the emitter body is injection molded for economy and production precision. Therefore, the various passages may have a slight draft in order to promote the removal of cores. The draft taper is approximately 0.003 inch over the approximate ½ inch length of the passage when the passage diameter is a nominal 3/16 inch size.

The moisture emitters of the invention are designed to provide a controlled slow flow of moisture from the supply line to the area of a plant. Passage 17 is therefore blocked by a spirally grooved member which may be a conventional threaded member such as a set screw 25. For clarity the threaded member is removed in FIG. 2 such that the tapered configuration of passage 17 may be shown. Alternatively, a conventional round-head screw 27 may be used in passage 17, as is shown in the stem 14A of the second emitter 10A of FIG. 1. In either case water flow is controlled by lengthening or shortening the channel defined by the member threads and the cylindrical wall 28 of the water passage 17.

The threaded member is preferably press-fitted into the passage such that the thread crests 29 make an interference fit with the passage wall 28. Polyvinyl chloride is a resilient material and the wall tends to be expanded by the threaded member. However, under the expansion pressure cold flow may take place at the crest of the thread such that a thread form is impinged upon the wall. The threaded member may thereby be moved relative to the axis of the passage by twisting the threaded member by means of the slot 31. Thus the length of the channel may be altered.

In the embodiment of FIG. 3 where the taper of passage 17 may be greater than the minimal necessary for core draft, the narrowing diameter of the tapered passage results in cold flow penetration of the thread groove by the material of the wall. This effect restricts the size of the channel and combines with channel length to limit the flow of moisture from the passage to the discharge port 22 and atmosphere.

The embodiment of FIGS. 1-3 is a moisture emitter adapted to be disposed in multiples serially along a continuing water supply line. A water chain of emitters can thus be established. However, it is often desirable to place a single moisture emitter at the terminal end of a tube. Such a moisture emitter 32 is shown in the embodiment of FIGS. 4-7. In that embodiment an emitter body 33 has a tube receiving neck 34 extending from a body block 35. A tube receiving entry passage 36 extends through the neck and into the body to a restricting wall 37 through which a flow restriction passage 38 extends into a water passage 39 similar in function to the passage 17 of the previously described embodiment. Like the passage 17, the passage 39 of the embodiment of FIG. 4 may have a slight taper to accommodate molding core removal during injection molding.

A conventional threaded screw 41 is pressfitted into the passage 39 such that an elongate spiral channel 40 is defined by the passage wall and the thread grooves of the screw 41. As previously explained, the pressfitting of the screw into the passage results in an imposed thread form in the passage while the screw is lodged therein. Thus the slot 42 of the screw affords means whereby turning of the screw within the passage may result in lengthening or shortening the channel defined by the thread grooves and the wall of the passage 39.

It is often desirable to locate the moisture emitter securely with respect to a plant. Therefore, a stake 44 extends from body 34 such that the emitter may be located in a definite site and the height of the emitter from the soil controlled within the limitations of the stake length. The stake may be integral with the body block or suitably attached thereto.

In the embodiment of FIGS. 4-7 the stake may have a T-configuration in cross section, as evident from FIG. 7. The T configuration has some advantages in terms of stake rigidity but is not necessarily required in all instances.

In the embodiment of FIG. 8, an emitter body 33 similar to the body described with respect to the embodiment of FIG. 4, is fragmentarily shown. A restrictive passage 38 opens upon a larger water passage 39 in which a conventional self-threading screw 47 is pressfitted. A spiral channel 49 is thus defined by the wall of passage 39 and the thread grooves of screw 47.

In most instances the desired water emission from the moisture emitters of the invention has been achieved utilizing water passages adapted to receive conventional threaded members of the number 8 screw size or number 10 screw size, although varying moisture demands can impose other dimensional standards upon the moisture emitters of the invention. The screw 47 of the embodiment of FIG. 8 may be a self-drilling screw of the type marketed under the trade name "Teks." In 10-32 nominal size, the Teks screw tapers from a major diameter of 0.194 inch to 0.188 inch in a half-inch thread length. The major and minor diameters of the passage 39 may be 0.155 inch to 0.152 inch in most cases, depending upon the draft requirements for removing the molding cores. Since the root diameter of the No. 10 screw is in the neighborhood of 0.150 inch, it can be seen that the pressfit of the conventional threaded member into the passage results in a tight fit. Nevertheless, under certain pressure conditions, conventional screws have been expelled from the passage by the water pressure. It is therefore desirable that the restrictive passage 38 be sized with respect to the passage 39 such that a pressure drop occurs on the downstream side of the restriction 38. The diameter of the restriction 38 may be varied with the water pressure conditions to be met in the field of use.

The screw 47 has two or more peripheral slots 52 at the terminal end of the thread. These slots are standard in a self-threading screw and aid in the starting of the acceptance thread which the screw cuts. However, in the present combination they have been found advantageous to afford alternate entry channels into the spiral channel defined by the passage wall and the screw thread and thus delay passage clogging due to small particles entering passage 39 from the main water flow.

Since the taper of the passage 39 differs from the taper of the screw 47, it can be seen that the spiral channel grows smaller in cross-sectional area as the screw advances in the passage. The axial displacement in the passage of the threaded member thus effects a water flow change by two factors: the change in the length of the spiral channel and the diminution of the channel area near its exit.

As in the previously described embodiments, passage 39 widens into an outlet or discharge port 54 which also aids in guiding the screw into the passage 39.

The embodiment of FIG. 8 may receive a solvent-dipped tube, like the tube 56 of the embodiment of FIG. 4, which adheres in the passage 36 connecting to the restriction 38, or, as illustrated in an alternate embodiment in FIG. 9, an emitter neck 33A may have s smooth exterior adapted to receive a tube 57 about the neck instead of in the entry passage 36A. As in the previous embodiments, the body 34 contains not only the entry passage 36A but a restrictive passage 38 and a water passage 39, in which a conventional threaded member like the set screw 59 is pressfitted. The operation of the embodiment of FIG. 9 is similar to that described with respect to the other embodiments. However, it differs from the other embodiments in that stake 61 is a single bar and does not have a T-configuration.

From the foregoing description of embodiments, it can be seen that the moisture emitter of the invention can take several forms, all of which benefit from the inventive combination which enables precise control of moisture emission in an inexpensive apparatus which can be easily assembled and regulated. Because of the restriction ramps 16 of the emitters of the embodiment of FIG. 1, a serious problem in previous serially arranged emitters has been solved. In operation the cooperation between the ramp 16 and the restrictive passage 21 has balanced pressures on downhill slope arrangements of serial emitters such that the effect of the greater head at the bottom of the slope has been overcome and air is not sucked into the line through the upper emitters. The ramp seems to direct flow through the restrictive passage in a manner which precludes air entering the line through the upper emitters. Whether this is due to a pressure change or a turbulence or an imposed flow direction is not presently known. What is known is that the combination disclosed effectively overcomes the problem of air entry in the upper emitters on a slope.

One of the advantages of the invention is that assembly is made simple between the conventional threaded member and the emitter body since a pressfit technique is used rather than a threading operation. The body is also inexpensive because there is no need to thread the passage 17 or 39 in the previously described embodiments to achieve a threadlike adjustment of the threaded member. The thread impression is believed due to the cold flow characteristics of many of the plastics which lend themselves to injection molding. As can be seen from FIG. 10 where the thread size is greatly enlarged, the passage is expanded by the thread crest 62 after the threaded member is pressfitted into the passage. However, there seems to be a reverse cold flow after the member is seated in the passage, wherein a spiral intrusion 63 enters the thread grooves 64 such that a thread form results in the wall 65 of the body block 34B of the emitter. The thread form imposed on the interior wall need not be deep in order to afford displacement of the threaded member when the member is turned within the passage. Therefore the characteristics of the material are utilized to achieve the easily regulated moisture emission in an economical fashion.

In FIG. 11, an alternate embodiment of a serially adapted moisture emitter 71 is shown. The emitter has a shank 13A and a stem 14A which define a T-shaped body 73. A passage 18A extends through the shank and receives two supply tube sections 11, 11A which are conveniently solvent welded into the passage 18A. The passage is restricted by a two-faced restriction ramp 16A which tends to restrict the size of the passage directly in line with a volume restriction passage 21A which opens upon a water emission passage 17A. However, shank 14A has a smooth exterior cylinder wall 75 upon which an internally threaded member, such as a cap 76, is pressfitted. Flow from the emitter is thus from passage 17A into a spiral channel 77 defined by the wall 75 and the thread grooves 78 of the cap 76. As in the previously described embodiments, the pressfitting or suitably dimensioned threaded members upon the shank results in an eventual thread form on the shank by which the cap 76 may be adjusted along the shank to lengthen or shorten the spiral channel 77 and thus control the water emission from the emitter 71. Cap 76 has a hexagonal outer configuration such that conventional wrenches may be used to torque the cap upon the shank and advance or retract its overlap of the cylinder wall.

In the embodiment of FIGS. 12 and 13 an emitter with a stake 61A receives water from a tube 56A whose end 56B is solvent welded within the entry passage 36A, as in the manner previously described. The entry passage 36A connects to a restriction passage 38A which in turn opens into a larger water passage 39A extending to an outlet 81. The embodiment of FIGS. 12 and 13 has an extending shank 83 upon which a spiral thread 84 is imposed. The exterior thread 84 of the emitter receives a cylindrical cap 86 having a smooth inner wall 87 which is pressfitted on the thread 84 of the shank. A cap boss 88 has a slot 89 by which the cap may be turned to move the cap with respect to the threaded grooves, say between the position of the cap in FIG. 12 and the position of the cap in FIG. 13 such that the length of the spiral groove defined by the threads 84 and the smooth wall 87 is altered. Water emerges at the upper end 91 of the cap and flows down the exterior of the cap to drip from the plug onto the soil about the plant at the location determined by the insertion of stake 61A in the soil.

The embodiment of FIG. 14 may be joined to a supply tube in the manner previously described by insertion of the tube (not shown) into entry passage 36A which, as previously described with respect to other embodiments, connects to a restrictive passage 38A which in turn opens into an enlarged passage 39A. The embodiment of FIG. 14 differs from the previously described moisture emitter bodies in that passage 39A has an internal thread 93 which is in pressfit contact with a smooth cylindrical wall 94 of an adjustable member 96. The member has a square head 97 to enable it to be turned within the passage 39A to adjust the length of the channel 98 defined between the wall 94 and the thread form 93.

It can be seen from these illustrative embodiments that the invention may be embodied in several combinations of cylindrical walls and thread forms. In each of the previously described embodiments flow is regulated by a change in the length of the spiral groove and/or a change in the groove depth due to a relative taper between the thread form and the cylindrical wall. This combination of elements has resulted in moisture emitters of unusually inexpensive fabrication. This characteristic of relatively low fabrication expense is also evident in the following embodiments.

In FIG. 15 a pair of moisture emitters 101, 102 which may be two of a plurality of serially arranged emitters, receive water from a plastic supply tube 104 which is solvent welded into an entry or receiving passage 105 of the moisture emitter body 106. Receiving passage 105 opens into an axially aligned internally threaded passage 108 having a plurality of threads 109 into which an adjustment member 111 is pressfitted. Member 111 has a smooth exterior, cylindrical surface 112, and an inner passage 113 in which a secondary water supply tube 114 is solvent welded. In like manner the other end of 114A of the secondary tube is solvent welded in second moisture emitter 102 which has like entry and threaded passages as the moisture emitter 101. A second adjustable member 111 is pressfitted into the threaded passage 108 and receives a secondary supply tube 114 in the passage 113 of the second adjustable member 111.

In operation, liquid emerging from supply tube 104 enters through the receiving passage 105 into the threaded passage 108 and encounters the added resistance of the adjustable member. The spiral channel 116 defined between the wall 112 of the adjustable member and the threads 109 of the passage 108 conducts water from passage 108 to emerge at 117 from the end of the thread form. In similar fashion water emerges at 118 from the second moisture emitter 102. The rate of flow at each of the points 117 and 118 is determined by the length of the channel 116 of each of the emitters, which of course depends upon the adjustable axial penetration of the adjustable members 111 within each passage 108.

In the embodiment of FIG. 16 a pair of moisture emitters 121, 122 are each comprised of a cylindrical tubular body segment 122A, having a cylindrical bore 123 with a smooth wall 123A into which a water supply tube 104 is solvent welded. Each moisture emitter 121, 122 further comprises a thread form 125 which is pressfitted into the bore 123 through the tubular emitter body. The thread form 125 may be on one end of the supply tube 104. Again, a spiral channel 126 is defined by the inner wall 123A of each emitter body and the thread form 125 on the end of supply tube 104. The thread form is pressfitted into the body 122A and may be adjusted therein by turning the supply tube 104 such that the impressed thread of the wall 123A conducts the thread form 125 to move along the bore. The length of the spiral channel 126 is thereby changed and the water flow emitted as the channel emerges at 128 from the body is thereby regulated.

A further alternate embodiment is shown in FIG. 17. A first water supply tube 131 is solvent welded within a passage 132 of a first moisture emitter 133. A second supply tube 134 has its one end 134A solvent welded in the passage 132 at the opposite end of the emitter body 133. The other supply tube end 134B is solvent welded in a second moisture emitter 136. Further moisture emitters may be serially joined with the two shown in FIG. 17 by means of a third supply tube 137, shown solvent welded in an end of the passage 132 in the second emitter.

Each of the moisture emitters has a restrictive planar ramp 16 opposite a discharge port 139 extending to the external threaded surface 141 of each emitter. The port connects between the passage 132 of the emitter and its exterior.

Each moisture emitter further comprises a shrink film tube 142 which is intimately imposed upon the thread form 141. Preferably the tube 142 is of polyvinyl chloride which is commercially available in tubular form in a shrink film configuration. Experiments have shown that PVC shrink film which has a shrink maximum wall thickness of 35 mils is adjustable on the thread form 141 by varying the shrink heat such that the water flow from port 139 outwardly in both directions through the spiral channel formed between the film tube 142 and the thread form 141 is precisely regulated. In the embodiment of FIG. 17 the rate of water emission is dependent upon several factors, the first being the water pressure delivered through the supply tubes 131, 134, etc. Secondly, the diameter of port 139 affects the water emission rate. A basic consideration is the length of the thread form in either direction from the port 139. However, given fixed dimensions for the length of the channel defined by the thread form and the shrink film and a fixed diameter for the port 139 and a fixed water pressure, the flow can be carefully calibrated by the degree and time of application of heat to the PVC tube 142 to shrink it about the thread form.

A further alternate embodiment is illustrated, partially broken away and partly in section, in FIG. 19. A moisture emitter 151 is similar in most respects to the previously described embodiment of FIG. 17, being supplied from a supply tube 131 and being serially connected to a second supply tube 134, such that several moisture emitters 151 may be serially connected. However, in the embodiment of FIG. 19, discharge port 139 emerges through a grooved exterior surface 153 which is comprised of oppositely spiraling grooves. One common form embodying oppositely spiraling grooves is a diamond knurled surface. A heat shrink tube 142 is in intimate contact with the surface 153. The embodiment of FIG. 19 thus affords a plurality of spiral grooves which with the shrink wrap define channels from passage 139 by which water may flow to the discharge circles 154, 155 at either end of the moisture emitter 151.

The illustrative embodiments disclose the economical combination of existing materials and elements in a manner giving precise control of water emission at a single point or in a water chain. While several embodiments have been shown, the scope of the invention is not exhausted thereby. Other variations within the scope of the invention will occur to those skilled in this art. It is therefore desired that the invention be measured by the appended claims rather than by the illustrative embodiments described herein.

I claim:

1. Moisture emitting apparatus for attachment to a water source comprising:

a first body member defining a water entry port and a first substantially cylindrical wall having an end in fluid communication with the entry port;

a second member defining a second substantially cylindrical wall;

a spiral thread formed in one of the first and second walls, the means defining the other wall being comprised of a resilient material to provide an initial substantially smooth surface which is arranged to be deformed by the screw threads of said one member, the first and second members being arranged to be screwed together so that the walls are concentrically arranged with the thread crests deforming the other wall to provide an interference fit for securing the members together, the thread groove and the other wall forming therebetween an elongate channel communicating at its inner end with the water entry port and forming at its outer end a water exit port, with the channel length being adjusted by the relative rotation of said two members.

2. Apparatus in accordance with claim 1 including a stake secured to the first body member for insertion into the soil.

3. Apparatus in accordance with claim 1 wherein the first body member has a "T" shaped configuration.

4. Apparatus in accordance with claim 1 further comprising a restrictive passage intervening between the entry port and the elongate channel.

5. Apparatus in accordance with claim 4 further comprising an expansion chamber downstream of the restrictive passage.

6. Apparatus in accordance with claim 1 wherein the spiral thread is formed on the second member.

7. Apparatus in accordance with claim 6 wherein the second member is provided with an internal thread.

8. Apparatus in accordance with claim 6 wherein the second member is provided with an external thread.

9. Apparatus in accordance with claim 6 including a stake secured to the first body member for insertion into the soil.

10. Apparatus in accordance with claim 6 wherein the first body member has a "T" shaped configuration.

11. Apparatus in accordance with claim 1 wherein the degree of interference fit determines the flow in the elongate channel.

12. Apparatus in accordance with claim 1 further comprising a relative taper between said cylindrical walls of the first and second members.

13. Apparatus in accordance with claim 12 wherein the first body member defines the discharge port and the second member is comprised of a conventional threaded screw.

14. Apparatus in accordance with claim 13 further comprising a restrictive passage between the entry port and the elongate channel.

15. Apparatus in accordance with claim 14 further comprising an expansion chamber downstream of the restrictive passage.

16. Moisture emitting apparatus for attachment to a water source comprising:

a body member defining a water entry port, a water exit port, and a substantially cylindrical exterior wall having at least one elongated groove therein, the groove being in fluid communication with the water exit port;

a shrink plastic wall of generally cylindrical configuration disposed over the exterior grooved wall of the body member so that the plastic wall forms a fluid tight fit with the crests on the body member to define an elongate channel between the shrink plastic wall and the groove extending from the water exit port to the atmosphere.

17. The apparatus in accordance with claim 16 wherein the shrink plastic wall is in the form of a thin walled tube.

18. Apparatus in accordance with claim 17 wherein the body member is in the form of a hollow cylinder arranged to be connected in series relationship with a tubular water supply source.

19. Apparatus in accordance with claim 18 wherein the shrink plastic tube is made of polyvinyl chloride.

20. Apparatus as defined in claim 18 wherein the exterior surface of the body member defines at least one spiraling groove.

21. Apparatus as defined in claim 17 wherein the elongated groove is in the form of a spiral.

22. Moisture emitting apparatus comprising:

a water supply tube arranged to be connected at one end to a source of water under pressure; and a plurality of moisture emitters connected in spaced series relationship along the water supply tube, each moisture emitter comprising:

a cylindrical body member with at least one elongated groove formed on the outer surface thereof, an opening through the wall of the body member to provide fluid communication between the interior thereof and the groove, and a shrink plastic film tube disposed over the exterior grooved wall of the body member so that the plastic tube forms a fluid tight fit with the crests on the body member to define an elongate channel between the plastic tube and the groove on the body member extending from the opening in the wall of the body member to the atmosphere.

* * * * *